March 1, 1966  W. KUNZER ET AL  3,237,917

VALVE WITH SAFETY BONNET AND COACTING HANDLE WITH SAFETY CAP

Filed July 11, 1962

INVENTORS:
WERNER KUNZER
ERNST SCHWARZ
WALTER SCHOLZ
WILHELM SEIFERT

BY Marzall, Johnston, Cook + Root

ATT'YS

United States Patent Office

3,237,917
Patented Mar. 1, 1966

3,237,917
VALVE WITH SAFETY BONNET AND COACTING HANDLE WITH SAFETY CAP
Werner Kunzer and Ernst Schwarz, Ludwigshafen (Rhine), Walter Scholz, Frankfurt am Main, and Wilhelm Seifert, Frankfurt am Main-Griesheim, Germany, assignors to Badische Anilin- & Soda-Fabrik Aktiengesellschaft, Ludwigshafen (Rhine), Germany, and Knapsack-Griesheim Aktiengesellschaft, Knapsack, near Cologne, Germany
Filed July 11, 1962, Ser. No. 209,008
Claims priority, application Germany, July 21, 1961, B 63,355
1 Claim. (Cl. 251—214)

This invention relates to a valve for shutting off corrosive media. More specifically, it relates to a high-pressure valve for gases and other fluids.

In valves for corrosive media, the material of the parts which come into contact with the corrosive media must be carefully chosen. The valve should be so designed that it can be opened and shut easily. This applies particularly to valves on gas cylinders that are filled with corrosive gases under high pressure. Valves of this kind must be absolutely gas-tight.

Corrosive media, e.g., gases, such as hydrogen halides, hydrogen sulfide etc. attack threads, e.g., in the body of the valve and on the valve stem, especially aggressively, with the formation of metal compounds such as metal chlorides or metal sulfides. These reaction products become firmly lodged in the threads, and obstruct the movement of the valve stem. The stem may be reinforced in order to create greater force when the stem is moved, but this measure is inadequate, e.g., in the case of gas cylinders, because of the limited dimensions of the handwheel, which cannot be increased indefinitely.

Valves for gas cylinders are known, in which the stem is secured by a threaded pin, or by a lock-nut, from being screwed out unintentionally. These safety devices, however, do not always work. It may happen that on turning the handwheel to open the valve, the gland and consequently the whole valve become unscrewed. As a result, the valve stem and stuffing box would be violently ejected, causing accidents.

Another known means of securing the gland consists of a lock washer with one or three lugs. These are not always sufficiently effective, particularly when the valve is operated by unskilled personnel.

It is an object of the present invention to provide a valve for corrosive media, preferably for gases under high pressure, in which valve unscrewing of the gland is prevented under all circumstances. If the gland were to leak, the high-pressure gas should not be allowed to escape without hindrance, but shielding means should be provided to obviate risk of accident.

Another object of the invention is the development of a type of a valve in which all the threaded parts are protected against the attack of corrosive media.

Another object of the invention is to provide a valve that cannot be disassembled unless one of the safety devices incorporated is destroyed or deformed.

Another object of the invention is the development of a valve that can still be housed under the protective caps hitherto used, despite improvement by additional parts.

These objects are accomplished by a high-pressure valve consisting of a one-piece body, a stem operated by means of a handwheel and sealed by means of a stuffing box, and a gland pressing against the packing and secured by a lock-nut.

According to the invention, the packing is placed in the valve chamber between the lower portion of the stem and the body, but the thread of the gland is arranged outside the valve chamber which is filled with the corrosive medium. The hexagonal bonnet is situated underneath the handwheel, and is fitted over the hexagonal top of the valve body, thus providing a protective covering for the gland and the lock-nut. The handwheel is held in position by a nut on the stem which is secured by a retaining ring, and which nut has a ring bearing upon it.

By arranging the packing inside and the gland thread outside the valve chamber, the thread is not attacked by the corrosive medium, and the valve still turns easily. The valve can thus be operated without great force. The hexagonal bonnet for securing the gland and lock-nut prevents the gland's becoming unscrewed when the valve is opened, and thus obviates the risk of any accident that could be caused by the whole stem and stuffing box packing being ejected. In order also to prevent uncontrolled unscrewing of the handwheel when the valve is in operation and to prevent the valve coming apart, the handwheel is secured by means of a ring, which encloses firmly and on all sides the nut on the stem which nut is intended to secure the handwheel. The nut cannot be released without destroying the ring.

A conical, pot-shaped recess is provided in the handwheel to accommodate the plastic ring and the nut on the spindle. This ring enclosing the nut on the spindle is made from a deformable plastic or meltable material, but once it has been installed, it cannot be removed without being destroyed. Thermoplastics, e.g., PVC, polystyrene or polyethylene, can serve as deformable materials.

An aperture is provided in the bonnet to prevent the accumulation of gas under pressure between the bonnet and the body of the valve in the event of leakage. By this means, the expanded gas or fluid leaving the stuffing box can blow off without risk of damage to the surroundings.

The packing consists of rings pre-pressed from packing materials that are self-lubricating even in the dry state. For lubrication of the packing materials, there may be used substances such as graphite, polytetrafluoroethylene, chlorinated paraffins, molybdenum disulfide, or polytetrafluoroethylene impregnated with molybdenum disulfide, or other similar substances that do not react chemically with the medium being sealed.

In the accompanying drawings, which by way of example illustrates an embodiment of a valve according to the invention, a valve for gas cylinders is shown.

Figure 1:
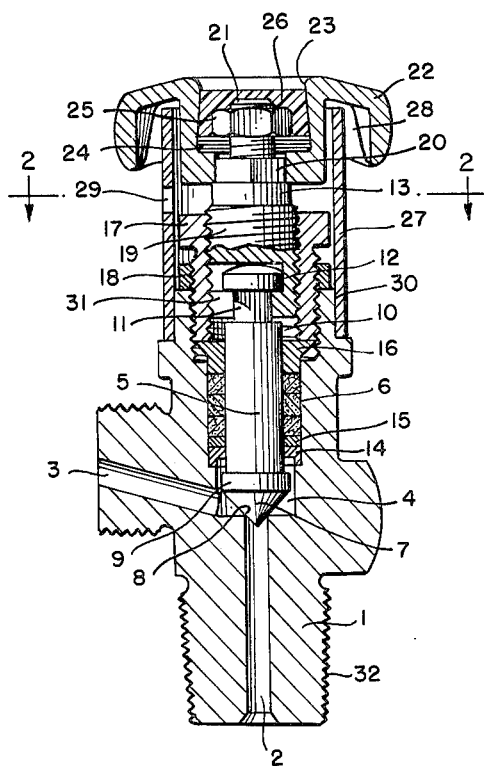
FIGURE 1 is a section on a diametric plane through said embodiment.
Figure 2:
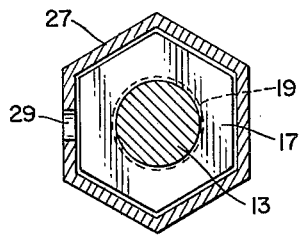
FIG. 2 is a section taken on section plane 2—2 of FIG. 1.

Two passages 2 and 3 for the inlet and outlet of the gas to be sealed off and a valve chamber 4 are accommodated in the body 1. The valve chamber connects the passages 2 and 3, and accommodates the parts necessary for shutting off the inlet gas. Shut-off is effected by the lower portion 5 of the stem, which is fitted above the upper opening of passage 2 and is sealed by means of a stuffing box packing 6 against the valve chamber 4 and the body 1. The lower stem 5 has a conical bottom 7, which effects a seal against the valve seat 8, a cylindrical shoulder 9, a guide 10, a cylindrical neck 11, and a cap 12. The lower stem 5 with its cylindrical neck 11 and cap 12 is slid into a horizontal recess 31 in the upper stem 13. The whole stem then consists of the lower stem 5 and the upper stem 13.

The packing 6 is supported against the valve chamber 4 by a bush 14 and an intermediate bush 15, and is pressed upon by a follower 16 upon which the gland 17 bears.

The latter is screwed by means of an external thread into the body 1 of the valve. The lock-nut 18 prevents the gland 17 from being unscrewed. The upper stem 13 with its lower threaded extremity 19 is screwed into the gland 17. The upper stem 13 has a square portion 20 with a threaded section 21 projecting above it. A handwheel 22 with a conical recess 23 is arranged over the square portion 20. The handwheel 22 and the upper stem 13 are connected on top of a retaining ring or washer 24 by means of a nut 25, which is secured in position by a ring 26 made of a thermoplastic or similar material. In order to protect the gland 17 and the lock-nut 18 against unintentional unscrewing, the top of the body of the valve 1 is milled to a hexagonal shape 30, and a hexagonal bonnet 27 is placed on top of this, the upper extremity 28 of the bonnet being lightly machined in order to allow trouble-free operation of handwheel 22.

The outer edge of the handwheel 22 is fitted low down over the bonnet 27, and prevents it from slipping upwards. The bonnet 27 cannot be removed when the handwheel is screwed down and secured without the ring 26 being destroyed. A passage 29 is drilled in the bonnet 27 for blowing off gas in the event of a leak in the stuffing box packing. The bonnet 27 is pushed over the outer hexagonal face of the gland 17 and the lock-nut 18, and prevents undesired turning of the two parts 17 and 18 on opening and shutting the valve. This ensures that although the lower stem 5 is turned together with the upper stem 13 when the valve is opened, the whole stem 5, 13 with the gland 17 and lock-nut 18 can never be unscrewed. Consequently, the lower stem 5 and the packing 6 cannot possibly be ejected by the gas pressure. The valve is provided with a conical thread 32, in order to allow it to be screwed into the gas cylinder.

We claim:

A valve comprising a valve body having a fluid passage therethrough, a polygonal bonnet seat defined by walls on said valve body, said valve body having a tubular passage, said tubular passage extending between an outer face of said valve body and said fluid passage, a portion of said tubular passage adjacent said outer face having threads therein, a gland having external threads threaded in said threads of said tubular passage and having a threaded, axial passage therethrough, said gland further having a segment outside said tubular passage with side walls defining a polygon, a valve stem extending through said tubular passage and said gland, valve stem packing means in said tubular passage about said valve stem, a valve seat in said fluid passage, a valve head on said valve stem adapted to be seated in said valve seat to close said fluid passage against fluid flow, external threads on said valve stem threadedly engaged with said threads in said axial passage, a handle secured to the end of said valve stem opposite the valve head, said handle being adapted to rotate said valve stem relative to said gland whereby said valve stem is moved axially by virtue of relative rotation of said last-mentioned, engaged threads, a bonnet having an axial passage therethrough, the walls of said axial passage being polygonal, the polygonal walls of said axial passage being matingly fitted over said polygonal bonnet seat and said side walls of said segment of said gland to lock said valve body and said gland against relative rotation, said end of said valve stem opposite said valve head projecting from said valve body and said gland and having external threads, said handle being held removably on said end by a nut threaded on said threads, said handle having formed therein a recess in which said nut is seated, a safety cap made of a thermoplastic polymer which can be softened thermally, means tightly seating said cap is said recess over said nut so that said nut can be threaded off said threads only by destroying said safety cap, and said handle projecting laterally across the outer end of said bonnet and contiguous thereto to preclude removal of said bonnet without prior removal of said handle, whereby visual observation of destruction of said safety cap serves as a warning to check possible removal of said bonnet and possible unscrewing of said gland in said valve body by turning said handle when said bonnet has been removed.

References Cited by the Examiner

UNITED STATES PATENTS

| 408,320 | 8/1889 | Powell | 251—214 X |
| 974,498 | 11/1910 | Kerbaugh | 251—221 X |
| 2,644,804 | 7/1953 | Rubin | 277—237 X |
| 2,668,034 | 2/1954 | Konwal | 251—330 |
| 2,865,596 | 12/1958 | Monnig | 251—368 X |
| 2,989,075 | 6/1961 | Johnston | 251—214 X |

FOREIGN PATENTS

| 476,881 | 12/1936 | Great Britain. |
| 790,051 | 2/1958 | Great Britain. |
| 130,220 | 11/1950 | Sweden. |

ISADOR WEIL, *Primary Examiner.*